United States Patent
Hébert et al.

(10) Patent No.: US 7,685,536 B2
(45) Date of Patent: Mar. 23, 2010

(54) WEBPAGE AUTOREFRESH

(75) Inventors: Cédric R. J. Hébert, Mouans Sartoux (FR); Mathieu Y. F. Guenec, Cagnes sur Mer (FR); Jérémie R. A. Clergue, Onex (CH)

(73) Assignee: SAP AG, Walldorf (DE)

( * ) Notice: Subject to any disclaimer, the term of this patent is extended or adjusted under 35 U.S.C. 154(b) by 49 days.

(21) Appl. No.: 10/547,575

(22) PCT Filed: Dec. 27, 2004

(86) PCT No.: PCT/IB2004/004275

§ 371 (c)(1),
(2), (4) Date: Aug. 31, 2005

(87) PCT Pub. No.: WO2006/070216

PCT Pub. Date: Jul. 6, 2006

(65) Prior Publication Data
US 2008/0148161 A1   Jun. 19, 2008

(51) Int. Cl.
G06F 15/00 (2006.01)
G06F 13/00 (2006.01)

(52) U.S. Cl. ........................ 715/854; 715/738
(58) Field of Classification Search ........... 715/718, 715/738, 851–855, 763–765, 736–739, 749, 715/713–715
See application file for complete search history.

(56) References Cited

U.S. PATENT DOCUMENTS

| | | |
|---|---|---|
| 6,128,701 A | 10/2000 | Malcolm et al. |
| 6,138,150 A | 10/2000 | Nichols et al. |
| 6,275,858 B1 | 8/2001 | Bates et al. |
| 7,065,713 B1 * | 6/2006 | Dutta et al. ................. 715/768 |
| 7,562,304 B2 * | 7/2009 | Dixon et al. ................ 715/738 |
| 2003/0065609 A1 | 4/2003 | Oh |
| 2004/0093562 A1 * | 5/2004 | Diorio et al. ................ 715/513 |
| 2004/0109011 A1 | 6/2004 | Peterson, Jr. |
| 2004/0250205 A1 * | 12/2004 | Conning ..................... 715/517 |
| 2005/0160065 A1 * | 7/2005 | Seeman ......................... 707/1 |
| 2005/0235220 A1 * | 10/2005 | Duperrouzel et al. ....... 715/788 |
| 2005/0283734 A1 * | 12/2005 | Santoro et al. .............. 715/765 |

OTHER PUBLICATIONS

Dias, G.V., "A Smart Internet Caching System," (Jun. 24, 1996), pp. 1-12, XP-002086721, [retrieved] Dec. 2, 1998, <http://www.isoc.org/isoc/whatis/co...es/inet/96/proceedings/a4/a4_3.htm>.

* cited by examiner

Primary Examiner—Cao (Kevin) Nguyen
(74) Attorney, Agent, or Firm—Fountainhead Law Group PC

(57) ABSTRACT

A system, method and apparatus is provided for automatic refresh of webpages. In one embodiment, the invention is a method. The method includes detecting a series of refresh requests for a first webpage exceeding a predetermined threshold within a period of time less than a predetermined time threshold. The method also includes setting a proposed refresh time to an interval of a set of predetermined intervals. The interval is the interval nearest to an average interval for the series of refresh requests within the series of predetermined intervals. The method additionally includes querying a user to begin an autorefresh for the first webpage. The method further includes receiving authorization to autorefresh the first webpage. The method also includes initiating autorefresh of the first webpage.

12 Claims, 8 Drawing Sheets

WEBPAGE AUTOREFRESH

CROSS-REFERENCE TO RELATED APPLICATION

None

TECHNICAL FIELD

The invention, in various embodiments, relates generally to computer software, and more specifically to webpage viewing and refreshing.

BACKGROUND

With the advent of the world wide web, a wealth of information is available. Users can search for information on virtually any topic, and expect to find something related on a webpage. Moreover, much information that was disseminated over periods of days or weeks a generation ago can now be disseminated and updated frequently. For example, stock quotes of stock exchanges or bourses were often available to most people only via newspapers or contact with a professional trader. However, many services available on the world wide web make such information available on a nearly real-time basis.

Similarly, many websites have information that is updated frequently, sometimes multiple times per minute. For some such information, technology is employed to make those updates automatically available. For example, RSS feeds are available on some sites, and other sites provide an automatic update controlled from the server which a user can elect by affirmatively choosing to update the webpage. However, many webpages are updated frequently, but offer no method for updating those webpages within a user's browser. Moreover, webpages may be updated frequently only on occasion, such as when an instructor at a school updates class information for example, or when an auction is occurring on line.

Whether by employees watching an online auction, students seeking information about classes, or users following prices of stocks or news information, the following procedure is often employed to refresh web pages. FIG. 1 illustrates an embodiment of a method of refreshing a webpage. Method 100 may be employed to refresh web pages frequently, and thereby obtain updated information. At module 110, a user accesses a webpage. The user accesses the page to obtain information which may be updated frequently or soon. At module 120, the user works for a few minutes at a job-related task. At module 130, the user refreshes the webpage, taking a minute from the job-related task to see if information has changed (such as tracking stock price changes for example). The user then returns to module 120 and works for a few more minutes, before progressing again to module 130 for another webpage refresh.

Analyzing this process, it becomes apparent that a worker working 4 minutes and spending 1 minute refreshing a webpage on a regular cycle will spend 20% of the time not doing work. Moreover, the worker potentially incurs startup delays each time the task is resumed, and may incur loss of productivity due to distractions involved in keeping track of when to refresh. Thus, worker productivity may be severely undermined by the presence of a webpage and a desire to refresh the webpage. As a result, it may be useful to provide a facility for refreshing any webpage automatically. Moreover, such a facility would preferably be under user control, rather than relying on features of the webpage.

SUMMARY

A system, method and apparatus is provided for automatic refresh of webpages. In one embodiment, the invention is a method. The method includes detecting a series of refresh requests for a first webpage exceeding a predetermined threshold within a period of time less than a predetermined time threshold. The method also includes setting a proposed refresh time to an interval of a set of predetermined intervals. The interval is the interval nearest to an average interval for the series of refresh requests within the series of predetermined intervals. The method additionally includes querying a user to begin an autorefresh for the first webpage. The method further includes receiving authorization to autorefresh the first webpage. The method also includes initiating autorefresh of the first webpage.

In another embodiment, the invention is a system. The system includes a processor. The system also includes a memory, a user interface and a network interface coupled to the processor. The system further includes a browser module coupled to the processor. The browser module includes a refresh listener. The browser module also includes an autorefresh engine.

Methods of the embodiments may be performed by a processor responsive to execution by the processor of a set of instructions, with the instructions embodied in a machine-readable medium. The invention may also be a machine-readable medium embodying instructions, which, when executed by a processor, cause the processor to perform the method, in some embodiments.

It will be appreciated that the present invention is described below using specific examples that are not intended to limit the invention. The systems and methodology may be applied to a broad range of other computer applications. Therefore these and other advantages and aspects of the present invention will become apparent to those skilled in the art upon a reading of the following detailed description and a study of the drawing figures.

BRIEF DESCRIPTION OF THE DRAWINGS

The present invention is illustrated in an exemplary manner by the accompanying drawings. The drawings should be understood as exemplary rather than limiting, as the scope of the invention is defined by the claims.

DETAILED DESCRIPTION

Figure 1:
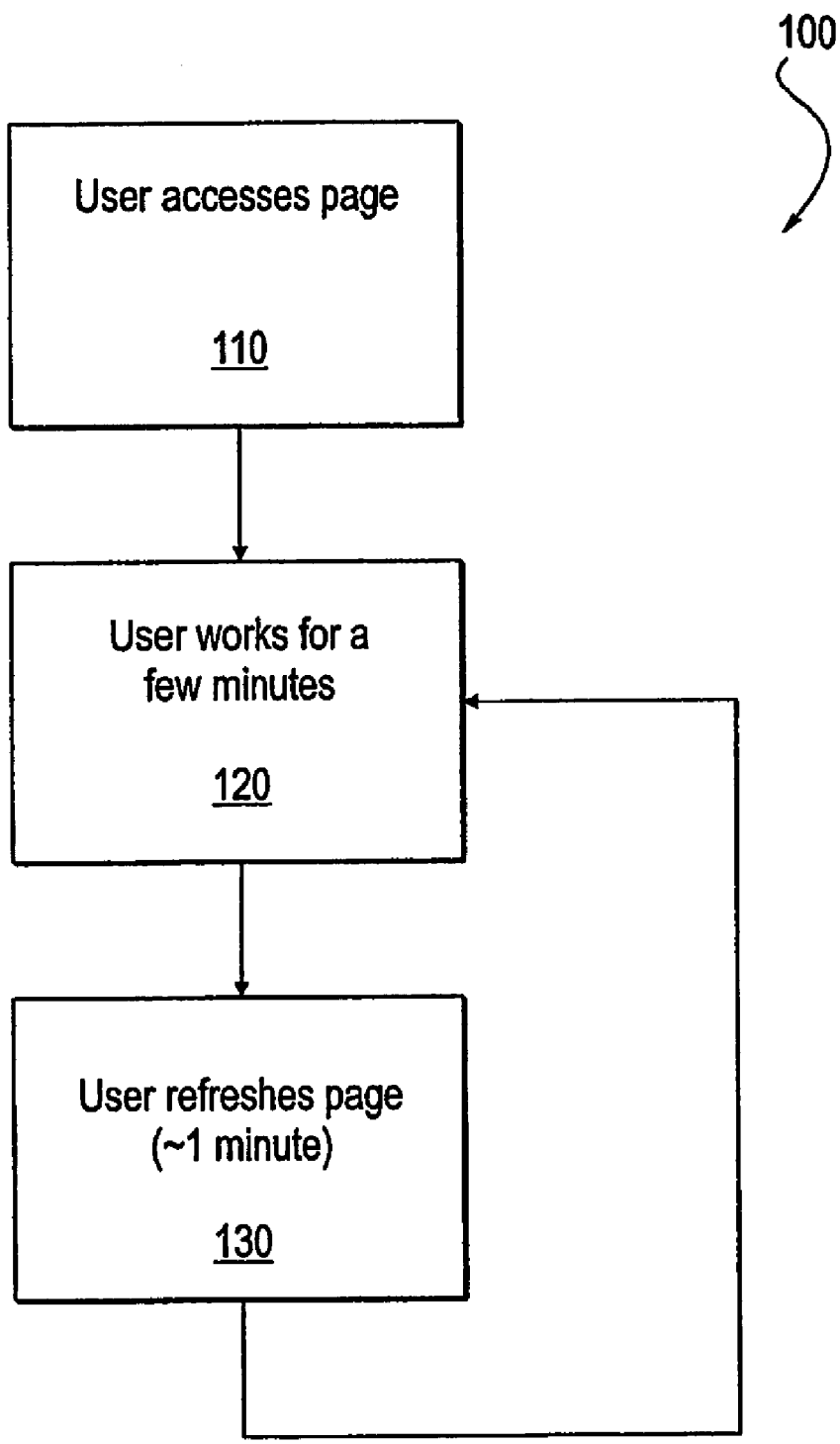
FIG. 1 illustrates an embodiment of a method of refreshing a webpage.

A system, method and apparatus is provided for automatic refresh of webpages. Such a method or apparatus, in various embodiments, may be used to automatically detect webpage refreshes and assume control of such refreshes, thereby freeing a user from a need to manually refresh webpages. The specific embodiments described in this document represent exemplary instances of the present invention, and are illustrative in nature rather than restrictive in terms of the scope of the present invention. The scope of the invention is defined by the claims.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

In one embodiment, the invention is a method. The method includes detecting a series of refresh requests for a first webpage exceeding a predetermined threshold within a period of time less than a predetermined time threshold. The method also includes setting a proposed refresh time to an interval of a set of predetermined intervals. The interval is the interval nearest to an average interval for the series of refresh requests within the series of predetermined intervals. The method additionally includes querying a user to begin an autorefresh for the first webpage. The method further includes receiving authorization to autorefresh the first webpage. The method also includes initiating autorefresh of the first webpage.

The method may include querying the user for a refresh interval for the first webpage. The method may also include setting the proposed refresh time to an interval received responsive to the querying for a refresh interval. The method may further include deactivating autorefresh of the first webpage.

In another embodiment, the invention is a system. The system includes a processor. The system also includes a memory, a user interface and a network interface coupled to the processor. The system further includes a browser module coupled to the processor. The browser module includes a refresh listener. The browser module also includes an autorefresh engine.

The browser module may also include a rules module. The browser module may further include a control module. The system may also include means for controlling the refresh listener and the autorefresh module.

In yet another embodiment, the invention is a method. The method includes detecting refreshes of a first webpage exceeding a predetermined threshold. The method further includes querying a user about whether to autorefresh the first webpage. The method also includes initiating autorefreshing of the first webpage.

The method may further include querying the user for an interval at which to autorefresh the first webpage. Initiating autorefreshing may include setting an autorefresh interval as the interval. The method may also include detecting when a time after refreshing the first webpage has exceeded the interval. The method may further include deactivating autorefreshing of the first webpage. Additionally, the method may include setting a default interval for autorefreshing of the first page.

Moreover, the method may include deactivating autorefreshing of the first page. Deactivating may occur responsive to a user request to stop. Deactivating may also occur responsive to a user change to a second webpage. Furthermore, deactivating may occur responsive to closing a window displaying the first webpage. Also, the method may include setting a default interval for autorefreshing of the first page based on an average of a set of intervals between detected refreshes of the first webpage. Similarly, the method may include querying the user for an interval at which to autorefresh the first webpage, with the default interval displayed and initiating autorefreshing may include setting an autorefresh interval as the interval.

Additionally, the methods of the embodiments may be performed by a processor executing a set of instructions, the set of instructions embodied in a machine-readable medium. Similarly, systems may embody a set of instructions in a machine-readable medium, which cause a general-purpose machine or computer to operate as a specific system when executing the set of instructions.

Figure 2:
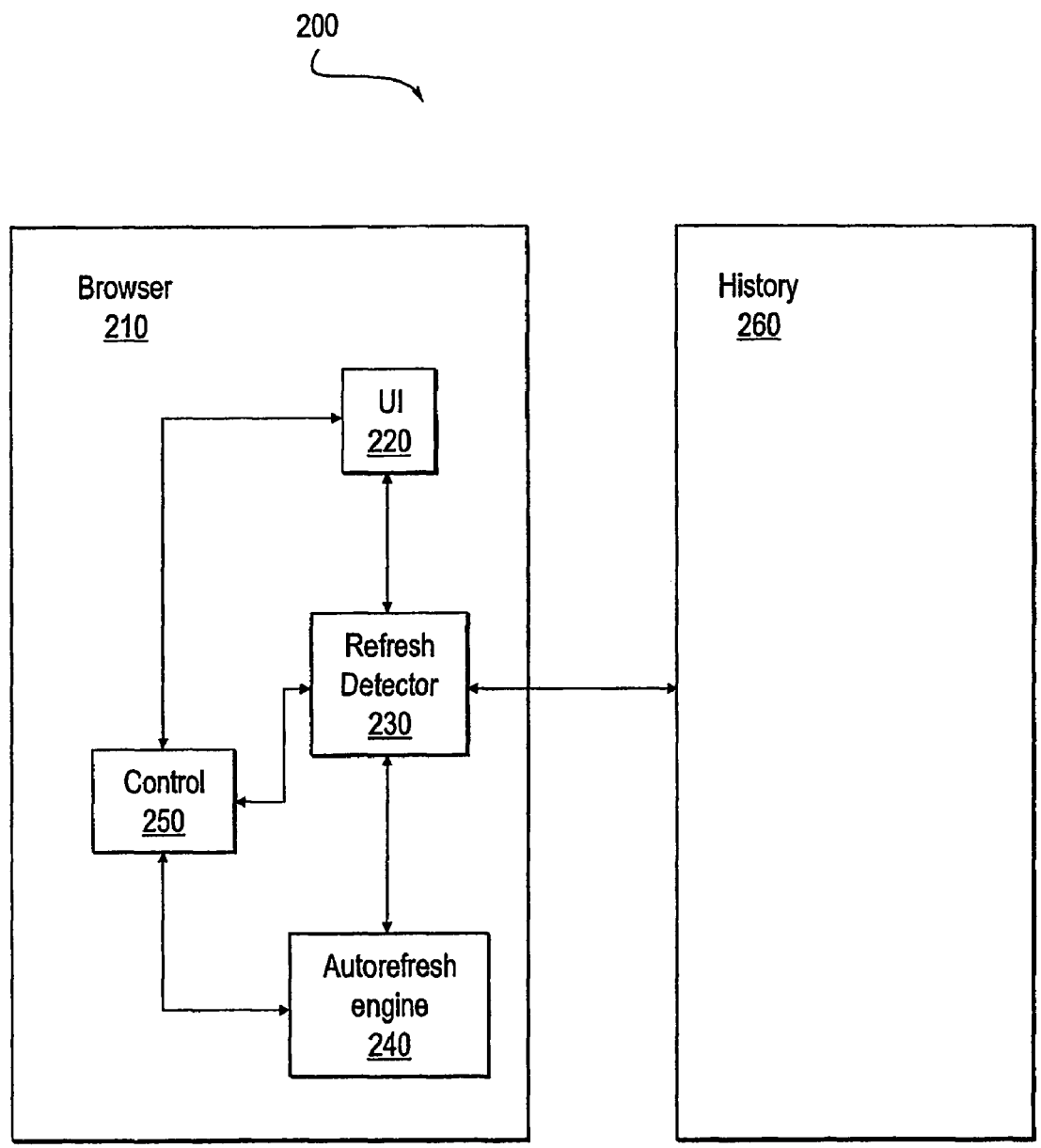
FIG. 2 illustrates an embodiment of a system which may be used to automatically refresh a webpage.

Various embodiments may be used to implement webpage autorefreshing. FIG. 2 illustrates an embodiment of a system which may be used to automatically refresh a webpage. System 200 includes a browser and a history data structure. The browser includes a user interface, refresh detector, autorefresh engine and control module. System 200 may then detect repeated refreshes of a webpage, offer to automatically refresh the webpage, and then automatically refresh the webpage for the user.

Browser 210 may be a conventional web browser, with additional features. User interface 220 provides for display of webpages and interacts with a user. Thus, a user may use user interface 220 to access a webpage and to refresh that webpage. Refresh detector 230 may then detect refreshes of the webpage, and indicate the user appears to be refreshing a webpage repeatedly, and thus may prefer an automatic refresh process. Refresh detector 230 may interact with history data structure 260 to determine whether a webpage has been refreshed often enough (meeting a quantity threshold) and quickly enough (meeting a timing threshold for requests to refresh from the user) in some embodiments.

Control module 250 may respond to the indication from refresh detector 230 by causing user interface 220 to query the user about whether an automatic refresh process should begin. If the user elects the process, autorefresh engine 240 may then operate to measure an interval of time and then automatically refresh the webpage without user intervention. Note that browser 210 and its components may be embodied in a machine-readable medium as well as being implemented as components of a hardware system.

Figure 3:
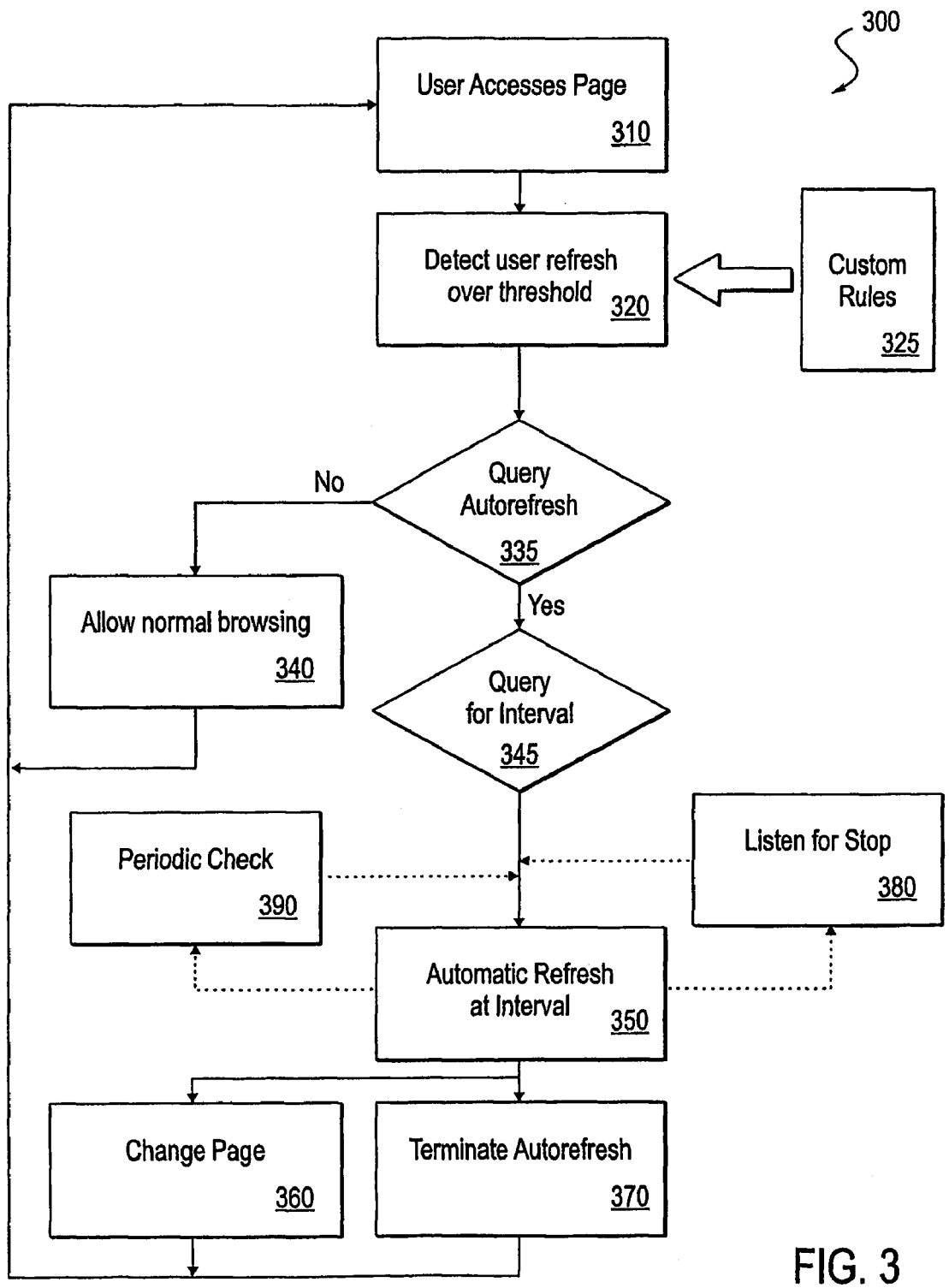
FIG. 3 illustrates an embodiment of a method of automatically refreshing a webpage.

While various systems may be employed with an autorefresh operation, a variety of methods may also be useful. FIG. 3 illustrates an embodiment of a method of automatically refreshing a webpage. Method 300 includes a user accessing a webpage, detecting frequent refreshes, offering autorefresh to the user, receiving a desired interval from the user, automatically refreshing the webpage, and ending the process. Method 300 and other methods of this document are composed of modules which may be rearranged into parallel or serial configurations, and may be subdivided or combined. The method may include additional or different modules, and the modules may be reorganized to achieve the same result, too.

At module 310, a user accesses a webpage, refreshing the webpage more than once. If the user has refreshed the page often enough, this is detected in module 320, based on custom rules 325. Custom rules 325 may include frequency and timing thresholds, for example, which are set within a system or for a particular machine or user.

With the user refresh over the threshold, at module 335 the user is offered the option of initiating autorefresh. If the user declines, normal browsing commences at module 340 and the process returns to module 310. If the user accepts autorefresh, the user is queried for an interval for refreshes at module 345. The interval is stored for use as the amount of time between automatic refreshes, and automatic refreshes then proceed at module 350.

If the user changes a page (to a different webpage), the process moves to module 360 and the autorefresh process ends for the original webpage. Likewise, if the user indicates the autorefresh should terminate (by hitting a stop button in a user interface for example), the process moves to module 370 and autorefresh terminates. As part of autorefresh at module 350, the process may listen for a stop signal at module 380, and may conduct periodic checks to verify the user wishes to continue with autorefresh (such as every 20 refreshes, for example) at module 390. Modules 380 and 390 may be suitable for integration with module 370, for example.

Additional features may be incorporated into the various methods. For example, if an autorefresh module detects that the webpage is no longer available, the user may be alerted. The user may have the option of terminating the autorefresh, displaying the last page found, and/or continuing to probe for an accessible version of the page. Similarly, if the autorefresh module detects that the webpage is taking a long time to refresh (exceeding a predetermined threshold of time for a refresh, for example), then the module may alert the user and offer to terminate the autorefresh process.

Moreover, users may choose to minimize a webpage which is being autorefreshed, or otherwise place the webpage in a background position—thus allowing for productive work for example. In such instances, an autorefresh module may alert a user to changes on the page (e.g. a web-based email account would change with new mail), or may bring the page to the front when changes occur. This may involve setting preferences for the user beyond a refresh rate in some embodiments.

Figure 4:
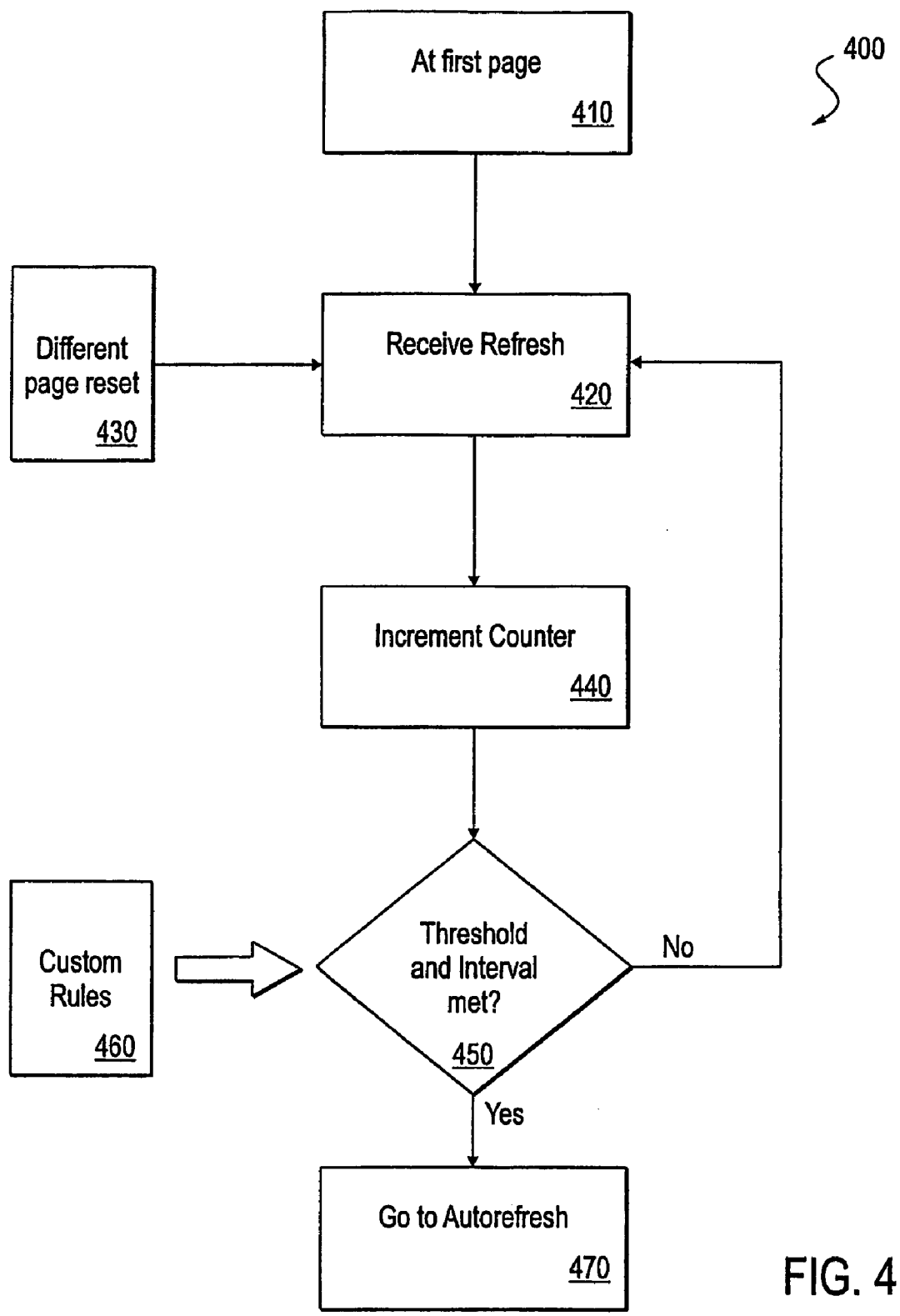
FIG. 4 illustrates an alternate embodiment of a method of automatically refreshing a webpage.

Other methods for autorefresh may also be employed. FIG. 4 illustrates an alternate embodiment of a method of automatically refreshing a webpage. Method 400 includes accessing a first page, receiving refresh(es), counting the refreshes, determining if a threshold has been met, and initiating autorefresh. Method 400 may also incorporate modules from method 300, for example, and may operate on a system such as that of FIG. 2 or FIG. 8, for example.

Method 400 commences with an access of a webpage at module 410. At module 420, the webpage is refreshed. At module 440, this refresh is counted by incrementing a counter. At module 450, a determination is made as to whether the counter has exceeded a threshold level. This determination may also include evaluation of whether the threshold was exceeded within a predetermined amount of time. If not, another refresh is received again at module 420. If so, autorefresh is initiated at module 470.

Note that having a different webpage viewed by the user will reset the counter at module 430. Moreover, note that the thresholds for quantity of refreshes and time over which refreshes occur may be set within a custom rule module 460, which may then feed such data to module 450 for the process 400. As such, customized thresholds may be set by a system administrator and/or a user.

Figures 5A, 5B:
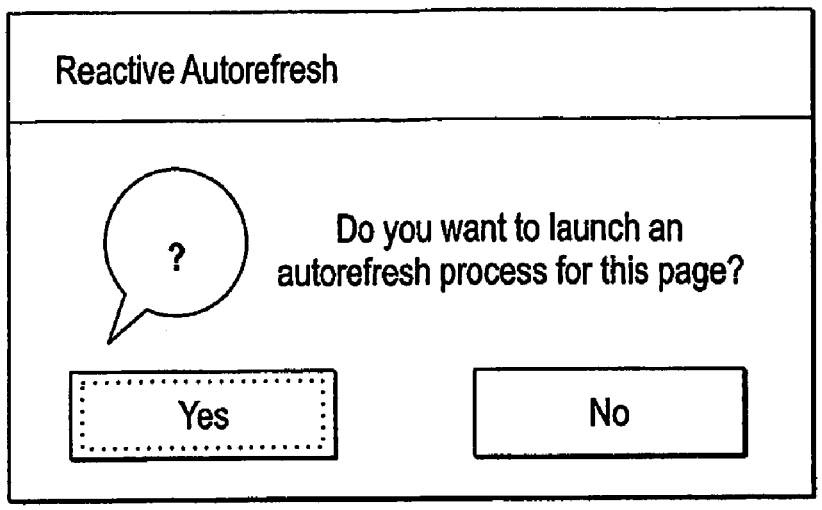
FIG. 5A illustrates an embodiment of a dialog box used in an automatic refresh system.
FIG. 5B illustrates an embodiment of another dialog box used in an automatic refresh system.

Making autorefresh available to users means that users must have the option of choosing whether to initiate autorefresh or not in some embodiments. FIG. 5A illustrates an embodiment of a dialog box used in an automatic refresh system. The dialog box provides the user the option of either accepting or declining autorefresh. This may be particularly useful, for example, when implementing module 335 of FIG. 3, or at the outset of a process for module 470 of method 400, for example.

Similarly, setting the frequency of autorefreshes may be important. FIG. 5B illustrates an embodiment of another dialog box used in an automatic refresh system. A list of potential time intervals in minutes is provided (such as in a drop-down menu for example), allowing a user to select through a user interface (such as user interface 220 for example) which interval to use in automatically refreshing a webpage. Then, a system or process may use that interval to measure how much time should elapse before the webpage is again automatically refreshed.

Moreover, in some embodiments, when several refreshes occur before automatic refresh is offered, an expected interval is provided to the user. For example, if a user refreshes approximately every 2 minutes four different times (to meet a threshold of four), the menu may arise with 2 already selected, allowing the user to either confirm the preselection or change it. Similarly, if a user refreshes five different times over a period of thirty-five minutes (meeting a threshold of five refreshes averaging seven minutes per refresh), the menu may preselect either five minutes (arithmetically closest or floor value of the average) or ten minutes (ceiling value of the average). Also, note that rather than using a menu, a form may be provided allowing a user to submit a number of minutes or other unit of time for automatic refreshes.

Figure 6:
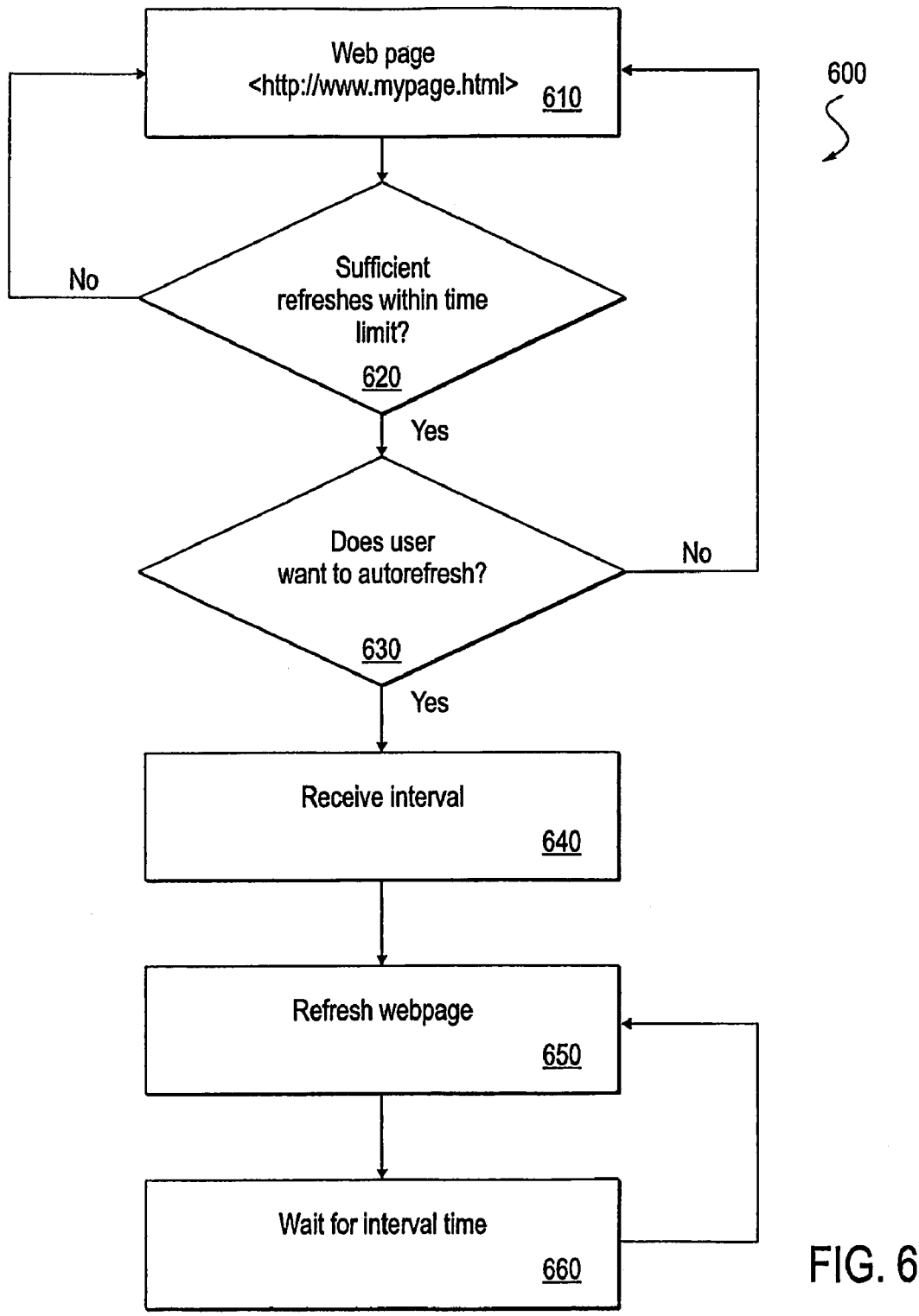
FIG. 6 illustrates an alternate embodiment of a method of automatically refreshing a webpage.

Other embodiments of methods may be used within the spirit and scope of the invention. FIG. 6 illustrates an alternate embodiment of a method of automatically refreshing a webpage. Method 600 includes accessing a webpage, determining if the webpage has been accessed enough to justify autorefresh, determining if the user wants to autorefresh, receiving an interval from the user, refreshing the webpage, and waiting for the interval received from the user. Method 600 may incorporate modules from methods 300 or 400 for example, and may be implemented in a system such as that of FIG. 2 or FIG. 8, for example.

Method 600 commences with module 610 and access to a webpage. At module 620, a determination is made as to whether sufficient refreshes (a predetermined number) have occurred over within a time limit (a predetermined time or interval). If not, the processes returns to module 610 for another refresh or to start over with a new webpage. If so, module 630 results in the user being queried as to whether autorefresh is desired. If autorefresh is not desired, the process returns to module 610.

If autorefresh is desired, a refresh interval is received at module 640. At module 650, the webpage is refreshed. At module 660, the process waits for the refresh interval to elapse. Then, the process returns to module 650 and the webpage is refreshed again, until the process is stopped either by user or machine intervention.

Figure 7:
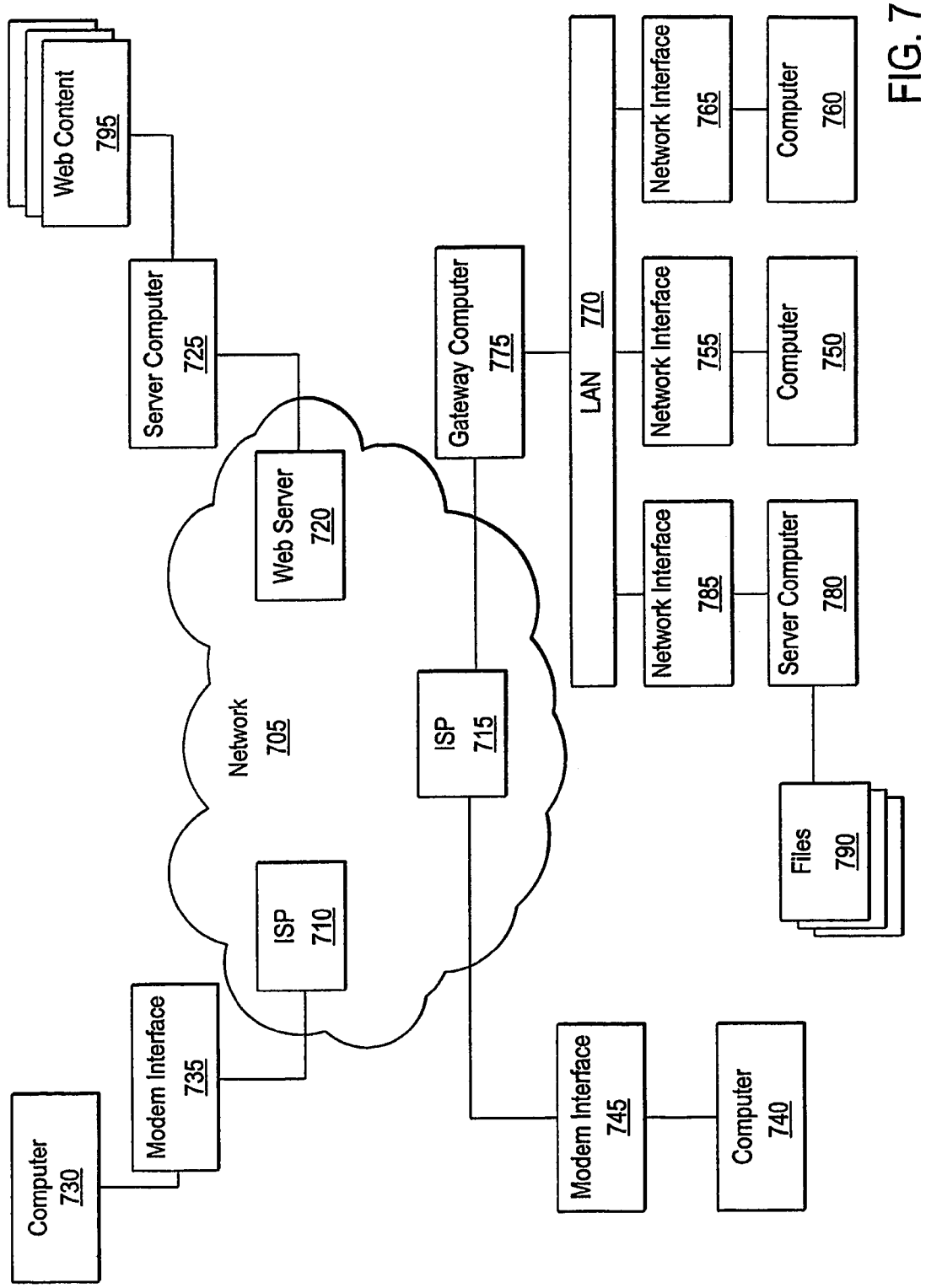
FIG. 7 illustrates an embodiment of a network in which simplified validity ranges may be useful.
Figure 8:
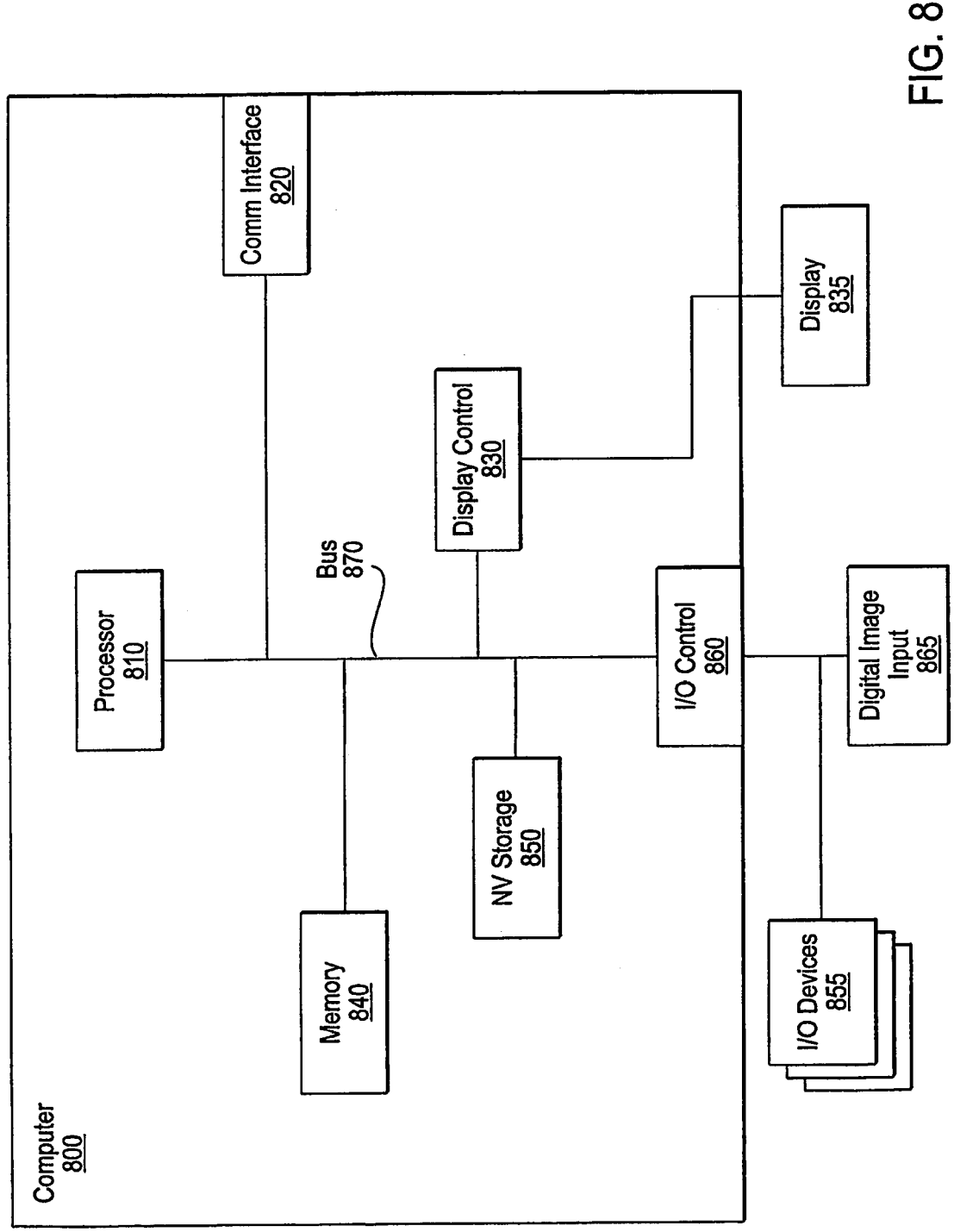
FIG. 8 illustrates an embodiment of a computer which may be used with simplified validity ranges.

The following description of FIGS. 7-8 is intended to provide an overview of computer hardware and other operating components suitable for performing the methods of the invention described above and hereafter, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the internet. The term "internet" as used herein refers to a network of networks which uses certain protocols, such as the tcp/ip protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 705 is typically provided by internet service providers (ISP), such as the ISPs 710 and 715. Users on client systems, such as client computer systems 730, 740, 750, and 760 obtain access to the internet through the internet service providers, such as ISPs 710 and 715. Access to the internet allows users of the client computer systems to exchange information, receive and send e-mails, and view documents, such as documents which have been prepared in the HTML format. These documents are often provided by web servers, such as web server 720 which is considered to be "on" the internet. Often these web servers are provided by the ISPs, such as ISP 710, although a computer system can be set up and connected to the internet without that system also being an ISP.

The web server 720 is typically at least one computer system which operates as a server computer system and is configured to operate with the protocols of the world wide web and is coupled to the internet. Optionally, the web server 720 can be part of an ISP which provides access to the internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides internet connectivity to the client computer system 730 through the modem interface 735 which can be considered part of the client computer system 730. The client computer system can be a personal computer system, a network computer, a web tv system, or other such computer system.

Similarly, the ISP 715 provides internet connectivity for client systems 740, 750, and 760, although as shown in FIG. 7, the connections are not the same for these three computer systems. Client computer system 740 is coupled through a modem interface 745 while client computer systems 750 and 760 are part of a LAN. While FIG. 7 shows the interfaces 735 and 745 as generically as a "modem," each of these interfaces can be an analog modem, isdn modem, cable modem, satellite transmission interface (e.g. "direct PC"), or other interfaces for coupling a computer system to other computer systems.

Client computer systems 750 and 760 are coupled to a LAN 770 through network interfaces 755 and 765, which can be ethernet network or other network interfaces. The LAN 770 is also coupled to a gateway computer system 775 which can provide firewall and other internet related services for the local area network. This gateway computer system 775 is coupled to the ISP 715 to provide internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the internet through the gateway system 775.

FIG. 8 shows one example of a conventional computer system that can be used as a client computer system or a server computer system or as a web server system. Such a computer system can be used to perform many of the functions of an internet service provider, such as ISP 710. The computer system 800 interfaces to external systems through the modem or network interface 820. It will be appreciated that the modem or network interface 820 can be considered to be part of the computer system 800. This interface 820 can be an analog modem, isdn modem, cable modem, token ring interface, satellite transmission interface (e.g. "direct PC"), or other interfaces for coupling a computer system to other computer systems.

The computer system 800 includes a processor 810, which can be a conventional microprocessor such as an Intel pentium microprocessor or Motorola power PC microprocessor. Memory 840 is coupled to the processor 810 by a bus 870. Memory 840 can be dynamic random access memory (dram) and can also include static ram (sram). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an i/o controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of storage device that is accessible by the processor 810 and also encompasses a carrier wave that encodes a data signal.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the Linux operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

The various embodiments of this invention have been described with reference to accesses of webpages. Webpages are typically accessed over a network, such as that illustrated in FIG. 7, using a machine or system such as that illustrated in FIG. 8. Moreover, such webpages typically are accessed using a browser such as browser 210 of FIG. 2. However, the various embodiments of this invention each have features which may be incorporated in other embodiments even though such features are not specifically discussed in those embodiments. This holds true even for use of features of the various methods as used in embodiments of systems, and similarly for features of the various systems which may be used in embodiments of methods.

In some embodiments, a database may be stored and accessible by a first machine, and a user interface may be implemented on a second machine. With the two machines linked, automatic field linking may be operated on one or both machines, using the user interface of the second machine and the database of the first machine, for example. Similarly, features and aspects of various embodiments may be integrated into other embodiments, and embodiments illustrated in this document may be implemented without all of the features or aspects illustrated or described.

One skilled in the art will appreciate that although specific examples and embodiments of the system and methods have been described for purposes of illustration, various modifications can be made without deviating from the spirit and scope of the present invention. For example, embodiments of the present invention may be applied to many different types of databases, systems and application programs. Moreover, features of one embodiment may be incorporated into other embodiments, even where those features are not described together in a single embodiment within the present document. Accordingly, the invention is described by the appended claims.

What is claimed is:

1. A system, comprising:
   a processor;
   a memory, coupled to the processor;
   a user interface coupled to the processor;
   a network interface coupled to the processor; and
   a browser module coupled to the processor, the browser module including:
      a refresh listener that is configured to detect refreshes of a first webpage, wherein the refreshes exceed a predetermined quantity threshold, and that is configured to query a user about whether to autorefresh the first webpage in response to the refreshes being detected; and
      an autorefresh engine that is configured to initiate autorefreshing of the first webpage in response to the query.

2. The system of claim 1, further comprising:
   a rules module of the browser module.

3. The system of claim 1, further comprising:
   a control module of the browser module.

4. The system of claim 1, further comprising:
   means for controlling the refresh listener and the autorefresh module.

5. A computer-implemented method, comprising:
   detecting, by a client computer, a series of refresh requests for a first webpage from a server computer, wherein the series of refresh requests exceed a predetermined quantity threshold within a period of time less than a predetermined time threshold;
   setting, by the client computer, a proposed refresh time to an interval of a set of predetermined intervals, the interval nearest to an average interval for the series of refresh requests within the series of predetermined intervals;
   querying, by the client computer, a user to begin an autorefresh for the first webpage;
   receiving, by the client computer, authorization to autorefresh the first webpage in response to the query; and
   initiating, by the client computer to the server computer, autorefresh of the first webpage in response to the authorization.

6. The method of claim 5, further comprising:
   querying the user for a refresh interval for the first webpage.

7. The method of claim 6, further comprising:
   setting the proposed refresh time to an interval received responsive to the querying for a refresh interval.

8. The method of claim 5, further comprising:

deactivating autorefresh of the first webpage.

9. The method of claim 8, wherein:

deactivating occurs responsive to a user request to stop.

10. The method of claim 8, wherein:

deactivating occurs responsive to a user change to a second webpage.

11. The method of claim 8, wherein:

deactivating occurs responsive to closing a window displaying the first webpage.

12. The method of claim 5, wherein:

the method is performed by a processor executing a set of instructions, the set of instructions embodied in a machine-readable medium.

* * * * *